US006631621B2

(12) United States Patent
VanderWoude et al.

(10) Patent No.: US 6,631,621 B2
(45) Date of Patent: Oct. 14, 2003

(54) CRYOGENIC TEMPERATURE CONTROL APPARATUS AND METHOD

(75) Inventors: David J. VanderWoude, Farmington, MN (US); Herman H. Viegas, Bloomington, MN (US); Jayaram Seshadri, Minneapolis, MN (US); Joseph Louis Glentz, Winona, MN (US); Bryan Edward Schwichtenberg, East Troy, WI (US); J. J. Shaw, Savage, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/187,459

(22) Filed: Jul. 1, 2002

(65) Prior Publication Data

US 2003/0029179 A1 Feb. 13, 2003

Related U.S. Application Data

(60) Provisional application No. 60/302,918, filed on Jul. 3, 2001.

(51) Int. Cl.[7] ............................ F25D 17/02; G17C 9/02; F25B 41/04
(52) U.S. Cl. ............................ 62/201; 62/50.2; 62/185; 62/216
(58) Field of Search .................... 62/201, 216, 185, 62/50.2, 239

(56) References Cited

U.S. PATENT DOCUMENTS 2,535,364 A   12/1950   Lee
2,720,084 A   10/1955   Hailey (List continued on next page.)

FOREIGN PATENT DOCUMENTS

FR        2217646        2/1973

OTHER PUBLICATIONS

SB–III CR Fact Sheet; Thermo King Corporation, Dec. 10, 1996.
SB–III CR Unit, Customer Sire Requirements; Automatic Filling Station, Thermo King Corporation, Dec. 10, 1996.
SB–III CR Unit: Refueling Requirements, Thermo King Corporations, Dec. 10, 1996.
SB–III CR Features; Thermo King Corporation, Jan. 22, 1997.
Thermoguard P–CR Microprocessor Control System Revision 450 x Software TK51262–2–OD (Rev. 1, 06–01), Diagnostic Manual, Copyright 2001—Thermo King Corp.—Minneapolis, MN.
SB–III CR Proof Copy TK51293–X.X, Copyright 2001—Thermo King Corp.—Minneapolis, MN, Dated Nov. 28, 2001.
SB–III CR TK 51309–2–OP (Rev. 07/01), Copyright 2001—Thermo King Corp.—Minneapolis, MN.

(List continued on next page.)

Primary Examiner—William C. Doerrler
(74) Attorney, Agent, or Firm—Michael Best & Friedrich LLP (57) ABSTRACT

A method of temperature control in a cryogenic temperature control apparatus comprises providing a heat exchanger in thermal communication with an air-conditioned space. The heat exchanger includes an air inlet and an evaporator coil having an outlet. The method further comprises providing a first temperature sensor being operatively coupled to a controller, measuring the temperature in the outlet and sending the temperature in the outlet to the controller, providing a second temperature sensor being operatively coupled to the controller, measuring the temperature in the air inlet, and sending the temperature in the air inlet to the controller, and providing a plurality of temperature control values. The flow of cryogen from a storage tank to the evaporator coil is altered each time the temperature in the outlet passes one of a first plurality of temperature control values and each time the temperature in the air inlet passes one of a second plurality of temperature control values.

19 Claims, 4 Drawing Sheets

U.S. PATENT DOCUMENTS

| | | | |
|---|---|---|---|
| 3,058,317 | A | 10/1962 | Putman |
| 3,121,999 | A | 2/1964 | Kasbohm et al. |
| 3,159,982 | A | 12/1964 | Schachner |
| 3,307,366 | A | 3/1967 | Smith |
| 3,314,007 | A | 4/1967 | Johnson |
| 3,421,336 | A | 1/1969 | Lichtenberger et al. |
| 3,507,128 | A | 4/1970 | Murphy et al. |
| 3,552,134 | A | 1/1971 | Arenson |
| 3,621,673 | A | 11/1971 | Foust |
| 3,693,370 | A | 9/1972 | Miller |
| 3,694,750 | A | 9/1972 | Schuhrke |
| 3,712,073 | A | 1/1973 | Arenson |
| 3,727,423 | A | 4/1973 | Nielson |
| 3,740,961 | A | 6/1973 | Fischer |
| 3,788,091 | A | 1/1974 | Miller |
| 3,802,212 | A | 4/1974 | Martin et al. |
| 3,823,568 | A | 7/1974 | Bijasiewicz et al. |
| 3,891,925 | A | 6/1975 | Dimeff |
| 3,990,816 | A | 11/1976 | Kohler et al. |
| 4,045,972 | A * | 9/1977 | Tyree, Jr. .................. 62/156 |
| 4,050,972 | A | 9/1977 | Cardinal, Jr. |
| 4,060,400 | A | 11/1977 | Williams |
| 4,082,968 | A | 4/1978 | Jones |
| 4,100,759 | A | 7/1978 | Tyree, Jr. |
| 4,165,618 | A | 8/1979 | Tyree, Jr. |
| 4,171,495 | A | 10/1979 | McNinch, Jr. |
| 4,186,562 | A | 2/1980 | Tyree, Jr. |
| 4,201,191 | A | 5/1980 | Zink et al. |
| 4,211,085 | A | 7/1980 | Tyree, Jr. |
| 4,224,801 | A | 9/1980 | Tyree, Jr. |
| 4,233,817 | A | 11/1980 | Toth |
| 4,321,796 | A | 3/1982 | Kohno |
| 4,333,318 | A | 6/1982 | Tyree, Jr. |
| 4,334,291 | A | 6/1982 | Geusic et al. |
| 4,343,634 | A * | 8/1982 | Davis ........................... 62/62 |
| 4,348,873 | A | 9/1982 | Yamauchi et al. |
| 4,350,027 | A | 9/1982 | Tyree, Jr. |
| 4,356,707 | A | 11/1982 | Tyree, Jr. et al. |
| 4,406,129 | A | 9/1983 | Mills |
| 4,439,721 | A | 3/1984 | Mura |
| 4,441,326 | A | 4/1984 | Bernauer et al. |
| 4,498,306 | A | 2/1985 | Tyree, Jr. |
| 4,543,793 | A | 10/1985 | Chellis et al. |
| 4,576,010 | A | 3/1986 | Windecker |
| 4,606,198 | A | 8/1986 | Latshaw et al. |
| 4,608,830 | A | 9/1986 | Peschka et al. |
| 4,626,781 | A | 12/1986 | Forkel |
| 4,688,390 | A | 8/1987 | Sawyer |
| 4,693,737 | A | 9/1987 | Tyree, Jr. |
| 4,695,302 | A | 9/1987 | Tyree, Jr. |
| 4,706,468 | A | 11/1987 | Howland et al. |
| 4,739,623 | A | 4/1988 | Tyree, Jr. et al. |
| 4,748,818 | A | 6/1988 | Satterness et al. |
| 4,783,972 | A | 11/1988 | Tyree, Jr. et al. |
| 4,856,285 | A | 8/1989 | Acharya et al. |
| 4,858,445 | A | 8/1989 | Rasovich |
| 4,878,362 | A | 11/1989 | Tyree, Jr. |
| 4,888,955 | A | 12/1989 | Tyree, Jr. et al. |
| 4,903,495 | A | 2/1990 | Howland et al. |
| 4,937,522 | A | 6/1990 | Gee |
| 4,940,937 | A | 7/1990 | Hattori |
| 4,941,527 | A | 7/1990 | Toth et al. |
| 4,995,234 | A | 2/1991 | Kooy et al. |
| 5,029,288 | A | 7/1991 | Kubota et al. |
| 5,040,374 | A | 8/1991 | Micheau |
| 5,056,324 | A | 10/1991 | Haley |
| 5,056,991 | A | 10/1991 | Peschka et al. |
| 5,069,039 | A | 12/1991 | Martin |
| 5,090,209 | A | 2/1992 | Martin |
| 5,095,709 | A | 3/1992 | Billiot |
| 5,124,602 | A | 6/1992 | Nishimura et al. |
| 5,127,230 | A | 7/1992 | Neeser et al. |
| 5,147,005 | A | 9/1992 | Haeggstrom |
| 5,170,631 | A | 12/1992 | Lang et al. |
| 5,172,559 | A | 12/1992 | Renken et al. |
| 5,199,275 | A | 4/1993 | Martin |
| 5,203,179 | A | 4/1993 | Powell |
| 5,209,072 | A | 5/1993 | Truckenbrod et al. |
| 5,243,821 | A | 9/1993 | Schuck et al. |
| 5,249,432 | A * | 10/1993 | Ichikawa ..................... 62/197 |
| 5,259,198 | A | 11/1993 | Viegas et al. |
| 5,267,443 | A | 12/1993 | Roehrich et al. |
| 5,267,446 | A | 12/1993 | Viegas et al. |
| 5,285,644 | A | 2/1994 | Roehrich et al. |
| 5,287,705 | A | 2/1994 | Roehrich et al. |
| D345,009 | S | 3/1994 | Lewis et al. |
| 5,291,130 | A | 3/1994 | Kendzior |
| 5,293,748 | A | 3/1994 | Flanigan |
| 5,305,825 | A | 4/1994 | Roehrich et al. |
| 5,311,927 | A | 5/1994 | Taylor et al. |
| 5,313,787 | A | 5/1994 | Martin |
| 5,315,840 | A | 5/1994 | Viegas et al. |
| 5,317,874 | A | 6/1994 | Penswick et al. |
| 5,320,167 | A * | 6/1994 | Johnson et al. ............... 165/64 |
| 5,333,460 | A | 8/1994 | Lewis et al. |
| 5,365,744 | A | 11/1994 | Viegas et al. |
| 5,396,777 | A | 3/1995 | Martin |
| 5,410,886 | A | 5/1995 | Wallace et al. |
| 5,410,890 | A | 5/1995 | Arima |
| 5,458,188 | A * | 10/1995 | Roehrich et al. ............. 165/64 |
| 5,477,690 | A | 12/1995 | Gram |
| 5,511,955 | A | 4/1996 | Brown et al. |
| 5,533,340 | A | 7/1996 | Shama et al. |
| 5,557,938 | A | 9/1996 | Hanson et al. |
| 5,561,986 | A | 10/1996 | Goodall |
| 5,564,277 | A | 10/1996 | Martin |
| 5,598,709 | A | 2/1997 | Viegas et al. |
| 5,606,870 | A | 3/1997 | Lester |
| 5,669,223 | A | 9/1997 | Haley et al. |
| 5,694,776 | A | 12/1997 | Sahm |
| 5,699,670 | A | 12/1997 | Jurewicz et al. |
| 5,711,161 | A | 1/1998 | Gustafson |
| 5,730,216 | A | 3/1998 | Viegas et al. |
| 5,775,110 | A | 7/1998 | Waldron |
| 5,819,544 | A | 10/1998 | Andonian |
| 5,870,897 | A | 2/1999 | Barr et al. |
| 5,908,069 | A | 6/1999 | Baldwin et al. |
| 5,916,246 | A | 6/1999 | Viegas et al. |
| 5,921,090 | A | 7/1999 | Jurewicz et al. |
| 5,947,712 | A | 9/1999 | Viegas et al. |
| 5,979,173 | A | 11/1999 | Tyree |
| 5,996,472 | A | 12/1999 | Nguyen et al. |
| 6,006,525 | A | 12/1999 | Tyree, Jr. |
| 6,038,868 | A | 3/2000 | Pooley et al. |
| 6,062,030 | A | 5/2000 | Viegas |
| 6,076,360 | A | 6/2000 | Viegas et al. |
| 6,086,347 | A | 7/2000 | Ryska et al. |
| 6,095,427 | A | 8/2000 | Hoium et al. |
| 6,106,255 | A | 8/2000 | Viegas et al. |
| 6,202,671 | B1 | 3/2001 | Horstmann |
| 6,220,048 | B1 | 4/2001 | Finan, Sr. et al. |
| 6,276,142 | B1 | 8/2001 | Putz |

OTHER PUBLICATIONS

Liquid Carbon Dioxide Transport Refrigeration System; Herman Viegas, Thermos King Corporation, 314 West 90$^{th}$ Street, Minneapolis, Minnesota USA 55420, Presented at The Seventh CRYOGENICS 2002 IIR International Conference in Prague, Czech Republic, Apr. 23–26, 2002.

* cited by examiner

CRYOGENIC TEMPERATURE CONTROL APPARATUS AND METHOD

CROSS-REFERENCE TO RELATED APPLICATION

This application claims priority under 35 U.S.C. §119 to a provisional patent application No. 60/302,918, filed on Jul. 3, 2001.

FIELD OF THE INVENTION

The invention relates generally to air conditioning and refrigeration systems, and more specifically to a cryogenic temperature control apparatus and a method of operating a cryogenic temperature control apparatus.

BACKGROUND OF THE INVENTION

Conventional cryogenic temperature control systems typically store a compressed cryogen such as carbon dioxide, liquid nitrogen, etc. in a pressurized storage tank. The cryogen is directed along a conduit from the storage tank to an evaporator coil that extends through a heat exchanger. Relatively warm air is passed across the evaporator coil and is cooled by the evaporator coil. The cooled air is returned to cargo compartment to pull down the temperature of the cargo compartment to a predetermined set point temperature. The warm air heats and vaporizes the cryogen in the evaporator coil. After the heat transfer has occurred, the vaporized cryogen is typically exhausted to the atmosphere.

Conventional cryogenic temperature control systems typically include a series of sensors which record temperature and pressure values in various locations throughout the system. The sensors generally supply the temperature and pressure data to a controller, which uses an elaborate fuzzy logic scheme to control the operating parameters of the system based upon the data provided by the sensors. In order to achieve and maintain the set point temperature, the controller periodically determines the rate of change of the temperature of the discharge air as well as the acceleration or deceleration of this rate of change. Based upon these and other calculations, the controller increments the flow of cryogen from the storage tank to the evaporator coil by activating and deactivating an electronically controlled valve. Generally, the fuzzy logic schemes are relatively complicated to program and to operate.

The controllers used to operate conventional cryogenic temperature control apparatuses are generally relatively complex. These systems generally require substantial computing power and programming skill to properly implement and operate. Additionally, the system complexity generally limits the flexibility of conventional cryogenic temperature control apparatuses. Also, they generally consume relatively large quantities of cryogen. This is particularly problematic on vehicle mounted cryogenic temperature control apparatuses. Cryogenic temperature control systems are currently used in mobile applications to control the temperature in a cargo compartment and are typically mounted on straight trucks, the trailer of a tractor-trailer combination, a refrigerated shipping container, a refrigerated railcar, and the like. For obvious reasons, it is generally desirable to reduce the weight and size of the cryogenic temperature control system. Often conventional storage tanks can weigh 1400 pounds or more when filled. It is therefore generally desirable to minimize the amount of cryogen that is carried in the storage tank and to reduce the rate at which the cryogen is consumed while ensuring that the air-conditioned space temperature is maintained at or near the set point. Additionally, cryogen may not always be readily available for refilling the storage tank so it is important, particularly during long hauls, to regulate the consumption of cryogen.

SUMMARY OF THE INVENTION

According to the present invention, a method of temperature control in a cryogenic temperature control apparatus comprising providing a heat exchanger in thermal communication with an air-conditioned space is provided. The heat exchanger includes an air inlet and an evaporator coil having an outlet. A first temperature sensor is operatively coupled to a controller, measures the temperature in the outlet, and sends the temperature in the outlet to the controller. A second temperature sensor is operatively coupled to the controller, measures the temperature in the air inlet, and sends the temperature in the air inlet to the controller. The invention further comprises providing a first plurality of temperature control values and a second plurality of temperature control values. The flow of cryogen from a storage tank to the evaporator coil is altered each time the temperature in the outlet passes the first plurality of temperature control values each time the temperature in air inlet passes the second plurality of temperature control values.

In preferred embodiments, the method of temperature control includes providing a first cooling mode corresponding to a first flow rate of cryogen from the storage tank to the evaporator coil, providing a second cooling mode corresponding to a second flow rate of cryogen from the storage tank to the evaporator coil, providing a third cooling mode corresponding to a third flow rate of cryogen from the storage tank to the evaporator coil, and providing a fourth cooling mode corresponding to a fourth flow rate of cryogen from the storage tank to the evaporator coil. Altering the flow of cryogen from the storage tank to the evaporator coil when the temperature in the outlet and the temperature in the air inlet are beyond the plurality of temperature control values includes switching between the first cooling mode, the second cooling mode, the third cooling mode, and the fourth cooling mode.

In preferred embodiments, a system for incorporating the method includes a first valve and a second positioned between the storage tank and the evaporator coil for altering the flow of cryogen from the storage tank to the evaporator coil. The first valve has a first position and a second position and the second valve has a third position and a fourth position. The first valve is moved into the first position and the second valve is moved into the third position to provide a first mass flow rate of cryogen from the storage tank to the evaporator coil. The first valve is moved into the first position and the second valve is moved into the fourth position to provide a second mass flow rate of cryogen from the storage tank to the evaporator coil. The first valve is moved into the second position and the second valve is moved into the third position to provide a third mass flow rate of cryogen from the storage tank to the evaporator coil. The first valve is moved into the second position and the second valve is moved into the fourth position to provide a fourth mass flow rate of cryogen from the storage tank to the evaporator coil.

The heat exchanger includes a heating element. The flow of cryogen from the storage tank to the evaporator coil is discontinued each time the temperature in the outlet passes at least one of a third plurality of temperature control values and each time the temperature in the air inlet passes at least one of a fourth plurality of temperature control values. Air in the heat exchanger is heated with the heating element each time the temperature in the outlet passes at least one of the third plurality of temperature control values and each time the temperature in the air inlet passes at least one of the fourth plurality of temperature control values.

Other features and advantages of the invention will become apparent to those skilled in the art upon review of the following detailed description, claims, and drawings.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION

Figure 1:
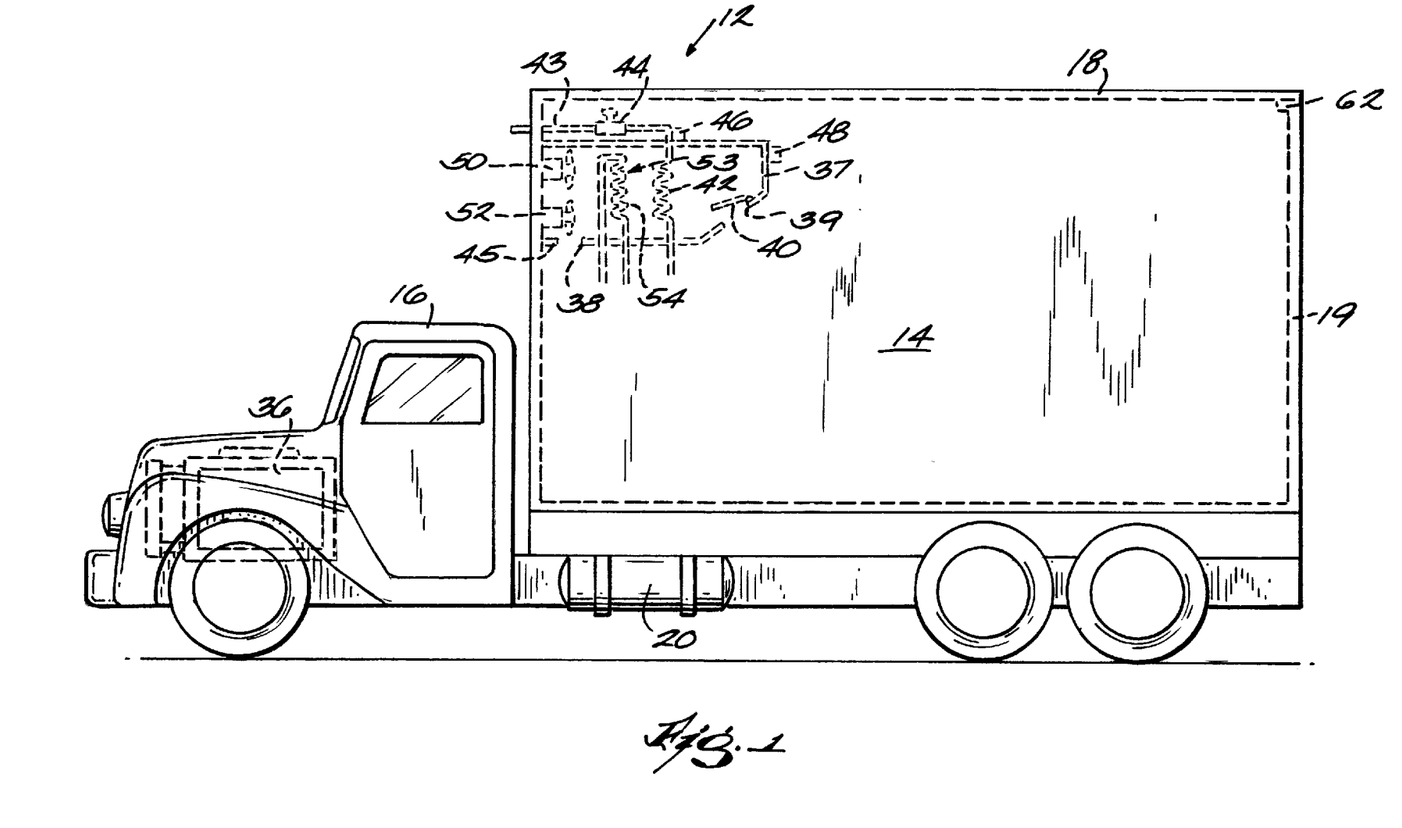
FIG. 1 is a side view of a truck including a preferred apparatus for implementing the present invention.
Figure 2:
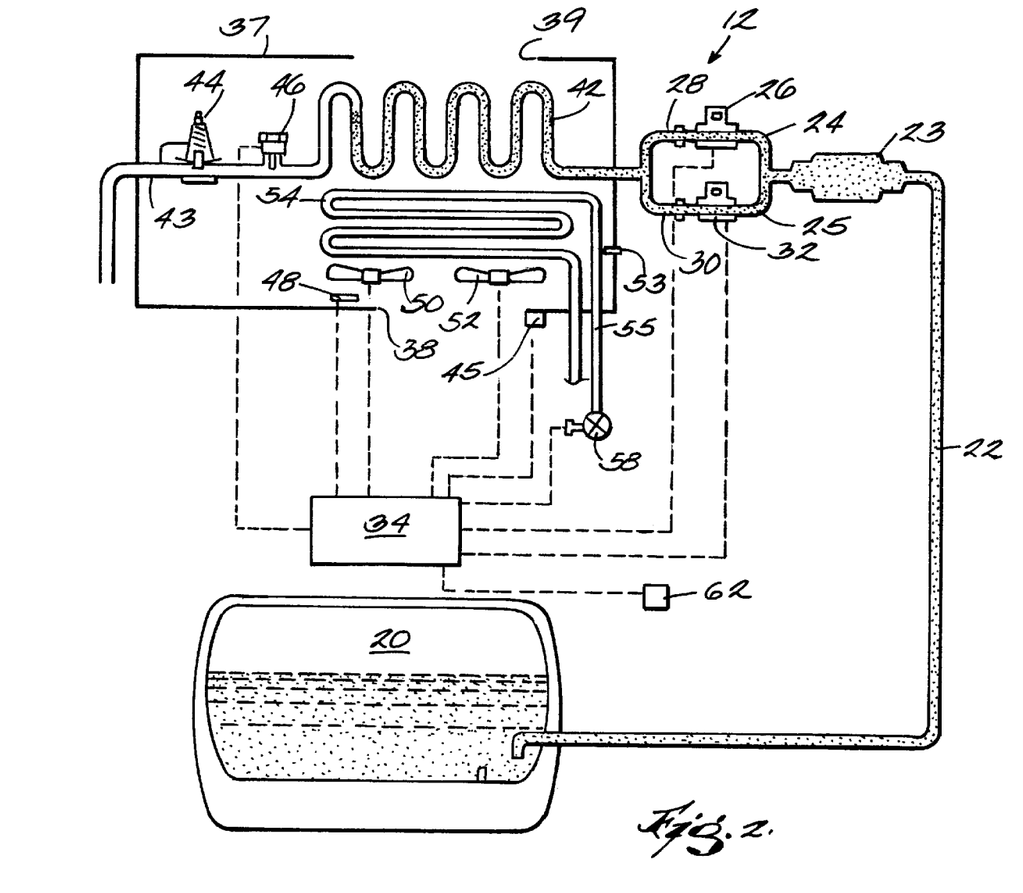
FIG. 2 is a schematic drawing of the cryogenic temperature control apparatus in accordance with the present invention.

FIGS. 1 and 2 illustrate a cryogenic temperature control apparatus 12 in accordance with the present invention. The cryogenic temperature control apparatus 12 is operable to control the temperature of an air-conditioned space 14. As shown in FIG. 1, the air-conditioned space 14 is the cargo compartment in a truck 16. In other applications, the cryogenic temperature control apparatus 12 can alternatively be used on other vehicles, such as a tractor-trailer combination, a container, and the like. Similarly, the cryogenic temperature control apparatus 12 can be used to control the temperature in the passenger space of a vehicle, such as for example, a bus or the passenger compartment of a truck. Alternatively, the cryogenic temperature control apparatus 12 can be operable in stationary applications. For example, the temperature control apparatus 12 can be operable to control the temperature of buildings, areas of buildings, storage containers, refrigerated display cases, and the like.

As used herein and in the claims, the term "air-conditioned space" includes any space to be temperature and/or humidity controlled, including transport and stationary applications for the preservation of foods, beverages, and other perishables, maintenance of a proper atmosphere for the shipment of industrial products, space conditioning for human comfort, and the like. The cryogenic temperature control apparatus 12 is operable to control the temperature of the air-conditioned space 14 to a predetermined set point temperature ("SP").

As shown in FIGS. 1 and 2, the air-conditioned space 14 has an outer wall 18, which includes one or more doors 19 that open into the air-conditioned space 14 so that an operator can insert a product into and remove the product from the air-conditioned space 14. The cryogenic temperature control apparatus 12 also includes a storage tank 20, which houses a cryogen under pressure. The cryogen is preferably carbon dioxide ($CO_2$). However, it will be readily understood by one of ordinary skill in the art that other cryogens, such as $LN_2$ and LNG can also or alternately be used. However, cryogens that are environmentally friendly and are non-reactive are highly desirable for obvious reasons.

A conduit 22 is connected to the underside of the storage tank 20 and includes a filter 23, a first branch 24, and a second branch 25. The conduit 22, including the first branch 24, defines a first flow path 28. Similarly, the conduit 22, including the second branch 25, defines a second flow path 30. As shown in FIG. 1, the first and second branches 24, 25 are fluidly connected to the storage tank 20 and converge at a junction located downstream from the storage tank 20.

With reference to FIG. 2, the first branch 24 includes a first control valve 26. The first control valve 26 has a first porting and controls the mass flow rate of cryogen through the first branch 24 during heating and cooling cycles. The first control valve 26 is preferably moved between a first open position and a first closed position by an electrically controlled solenoid (not shown). However, in other applications, other valves and actuators can also or alternatively be used.

The second branch 25 also extends from a low point of the storage tank 20 and includes a second control valve 32. The second control valve 32 has a second porting, which is preferably smaller than the first porting. However, in some embodiments of the present invention, the first and second control valves 30, 32 can have the same porting. The second control valve 32 is preferably an electrically operated valve and controls the mass flow rate of cryogen through the second branch 25 during heating and cooling cycles. Preferably, the second control valve 32 is operated by an electrically controlled solenoid (not shown), which moves the second control valve 32 between a second open position and a second closed position. However, as explained above with respect to the first control valve 30, other valves and actuators can also or alternatively be used.

Additionally, as shown and described herein, the first and second control valves 26, 32 are preferably two position on/off valves. However, one of ordinary skill in the art will appreciate that in other applications, one or both of the first and second control valves 26, 32 can be modulation valves, pulse valves, expansion valves, or the like. In these embodiments, the cryogenic temperature control apparatus 12 can provide a greater variety of available mass flow rates between the storage tank 20 and an evaporator coil 42 (described below). Similarly, in other embodiments (not shown), the flow path 22 can include three or more conduits, which extend between the storage tank 20 and the evaporator coil 42. Each of these conduits can include a control valve (not shown) for regulating the mass flow rate of cryogen out of the storage tank 20.

The first and second control valves 26, 32 are controlled by a microprocessor controller 34. As explained in more detail below, the controller 34 preferably uses ladder logic to control the flow of cryogen out of the storage tank 20. The controller 34 is preferably powered by the truck's engine 36 or by an alternator (not shown) positioned within the engine 36. In alternative embodiments, the controller 34 can also or alternatively be powered by a battery, a fuel cell, a generator, or the like. In other embodiments, a stationary power source (not shown), for example an outlet located on a building, can supply power to the controller 34.

As shown in FIG. 1, a heat exchanger 37 is positioned within the air-conditioned space 14 and includes an air intake 38 and an air outlet 39. In operation, air from the air-conditioned space 14 enters the heat exchanger 37 through the air intake 38 and is exhausted through the air outlet 39. As shown in FIG. 1, the air outlet 39 preferably includes a damper 40 for altering airflow through the heat exchanger 37. Alternatively, in some embodiments (not shown), the heat exchanger 37 does not include a damper 40 and fans or blowers independently control airflow through the heat exchanger 37.

The first and second flow paths 28, 30 are fluidly connected to an inlet of an evaporator coil 42 located in the heat exchanger 37. During cooling operations, cryogen from the storage tank 20 flows along the flow path 22 in a liquid or mostly liquid state into the evaporator coil 42. Air from the air-conditioned space 14 travels across the evaporator coil 42 and is cooled by the relatively cold evaporator coil 42. At the same time, the cryogen in the evaporator coil 42 is vaporized by contact with the relatively warm air. The cooled air is returned to the air-conditioned space 14 through the air outlet 39 to cool the air-conditioned space 14 and the vaporized cryogen flows out of the evaporator coil 42 through an outlet 43 and is exhausted to the atmosphere.

The outlet 43 includes a back pressure regulator 44. The back pressure regulator 44 may automatically regulate the cryogen vapor pressure above a predetermined value or the back pressure regulator 44 may be electrically operated and controlled by the controller 34. Alternatively, a mechanical type, automatic back pressure regulating valve can be used. The back pressure regulator 44 maintains the pressure within the evaporator coil 42 at a desired pressure. Preferably, the desired pressure is equal to or slightly above the triple point of the cryogen. For example, in applications in which the cryogen is carbon dioxide, the back pressure regulator 44 maintains the pressure in the evaporator coil 42 above 60.43 psig.

The cryogenic temperature control apparatus 12 also includes three sensors. The first sensor or return air sensor 45 is located between the evaporator coil 42 and the inlet 38 and records the return air temperature ("RA"), which is the temperature of the air returning to the heat exchanger 37 from the air-conditioned space 14. The second sensor or evaporator coil outlet temperature sensor 46 is positioned adjacent the outlet 43 and records the temperature of cryogen vapor ("ECOT") exiting the evaporator coil 42. The third sensor or defrost termination switch 48 is positioned on the heat exchanger 37 and signals the controller 34 when the temperature of the heat exchanger 37 reaches a predetermined defrost termination temperature ("DTS").

As shown in FIGS. 1 and 2, a first fan 50 and a second fan 52 are positioned within the heat exchanger 37 and are operable to draw air from the air-conditioned space 14 through the heat exchanger 37, which includes a heating element 53. In other applications, the heat exchanger 37 may include one, three, or more fans 50. As shown in FIG. 2, a heating element 53 is located in the heat exchanger 37 and includes a heating coil 54 and a fluid conduit 55, which extends between the heating coil 54 and a coolant cycle (not shown) located in the truck's engine 36. A third valve 58 is positioned along the fluid conduit 55 for controlling the flow of engine coolant from the cooling cycle to the heating coil 54. During operation, the engine 36 heats the coolant in the coolant cycle. When heating is required, the third valve 58 is opened and coolant is directed through the heating element 53 to heat air in the heat exchanger 37. In other embodiments, other fluids can be heated and can be directed through the heating element 53 to heat air in the heat exchanger 37. In still other embodiments, other heating elements 53, such as for example, electrical heaters (not shown) can also or alternatively be used to heat air in the heat exchanger 37.

To begin operation of the cryogenic temperature control apparatus 12, the user is prompted to enter operating parameters into the controller 34, including the set point temperature SP. Other operating parameters are described below and may be entered at startup by the user or may be preprogrammed by a system administrator. The cryogenic temperature control apparatus 12 is preferably operable in either a Fresh Cooling Range or a Frozen Cooling Range. During startup, the user preferably directs the controller 34 to operate the cryogenic temperature control apparatus 12 in either the Fresh Cooling Range or in the Frozen Cooling Range by selecting the set point temperature SP. If the user enters a set point temperature SP that is equal to or below 15° F., the unit will operate in the Frozen Cooling Range. Conversely, if the user enters a set point temperature SP that is greater than 15° F., the unit will operate in the Fresh Cooling Range.

Once the set point temperature SP and the other operating parameters are entered, the first and second fans 50, 52 preferably cycle on for a predetermined time period (e.g., 30 seconds) to circulate air in the air-conditioned space 14. The controller 34 then begins operation in either the Fresh Cooling Range or the Frozen Cooling Range.

Figure 3:
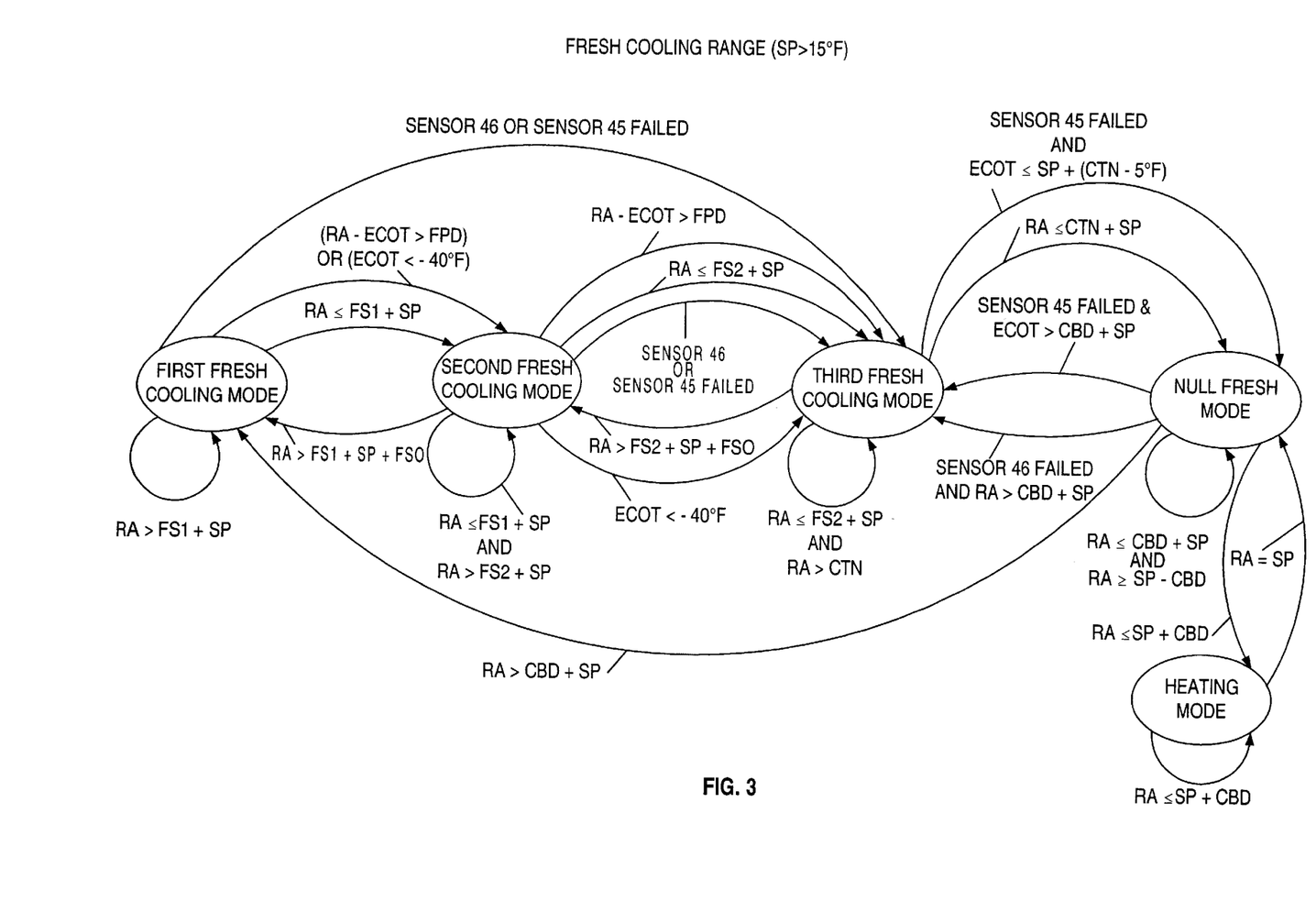
FIG. 3 is a diagram detailing operation in the Fresh Cooling Range.

Referring first to FIG. 3, the Fresh Cooling Range includes six modes of operation, including a First Fresh Cooling Mode, a Second Fresh Cooling Mode, a Third Fresh Cooling Mode, a Null Fresh Mode, a Heating Mode, and a Defrost Mode. If the Fresh Cooling Range is selected, the controller 34 directs the cryogenic temperature control apparatus 12 to begin operation in one of these modes based upon data supplied by the return air temperature sensor 45, the evaporator coil outlet sensor 46, and the defrost termination switch 48.

If the return air temperature RA is passes the sum of the set point temperature SP and a first switch point temperature ("FS1") (e.g. 6° F.), the controller 34 is programmed to operate the cryogenic temperature control apparatus 12 in the First Fresh Cooling Mode. In the First Fresh Cooling Mode, the first and second control valves 26, 32 are opened to allow a maximum flow rate of cryogen through the evaporator coil 42, thereby providing a rapid temperature pull down. The first and second fans 50, 52 are turned on and the damper 40 is opened to provide airflow across the evaporator coil 42. Additionally, the third valve 58 is closed to ensure that no coolant enters the heating element 53.

If the return air temperature RA is less than or equal to the sum of the first switch point temperature FS 1 and the set point temperature SP at startup, the controller 34 is programmed to begin operation in the Second Fresh Cooling Mode. Similarly, if after operating in the First Fresh Cooling Mode, the return air temperature RA drops below or becomes equal to the sum of the first switch point temperature FS1 and the set point temperature SP, the controller 34 shifts the cryogenic temperature control apparatus 12 into the Second Fresh Cooling Mode.

In the Second Fresh Cooling Mode, the first valve 26 is opened and the second valve 32 is closed to provide a second flow rate of cryogen through the evaporator coil 42, thereby providing a relatively rapid temperature pull down and simultaneously conserving cryogen. The first and second fans 50, 52 are turned on and the damper 40 is opened to provide airflow across the evaporator coil 42. Additionally, the third valve 58 is closed to ensure that no coolant enters the heating element 53.

The controller 34 is also programmed to shift the cryogenic temperature control apparatus 12 into the Second Fresh Cooling Mode from the First Fresh Cooling Mode if the sensors determine that liquid cryogen is about to exit the evaporator coil 42 and enter the outlet 43. In some cases, particularly when the mass flow rate of cryogen through the evaporator coil 42 is relatively high, some or all of the cryogen may not be completely vaporized in the evaporator coil 42. In these cases, the cryogenic temperature control apparatus 12 is not operating in the most efficient manner. Additionally, if flooding is left unchecked, some or all of the cryogen may solidify in the evaporator coil 42, rendering the cryogenic temperature control apparatus 12 inoperable. Therefore, if the difference between the return air temperature RA and the evaporator coil outlet temperature ECOT is greater than a flood point differential ("FPD") (e.g., 15° F.), the controller 34 is programmed to shift from the First Fresh Cooling Mode to the Second Fresh Cooling Mode. Similarly, if the evaporator outlet coil temperature ECOT drops below −40° F., the controller 34 is programmed to shift the cryogenic temperature control apparatus 12 from the First Fresh Cooling Mode into the Second Fresh Cooling Mode.

The cryogenic temperature control apparatus 12 continues to operate in the Second Fresh Cooling Mode until either of two conditions is achieved. First, if the return air temperature RA rises above the sum of the set point temperature SP, the first switch point temperature FS1 and a fresh switch offset ("FSO") (e.g., 2° F.), the cryogenic temperature control apparatus 12 shifts into the First Fresh Cooling Mode. Second, if the return air temperature RA drops below or becomes equal to the sum of the set point temperature SP and a second switch point temperature ("FS2") (e.g., 3° F.), the cryogenic temperature control apparatus 12 shifts into the Third Fresh Cooling Mode.

Additionally, in some applications flooding can occur during operation in the Second Fresh Cooling Mode. Therefore, the controller 34 is preferably programmed to shift the cryogenic temperature control apparatus 12 into the Third Fresh Cooling Mode if the difference between the return air temperature RA and the evaporator coil outlet temperature ECOT is greater than the flood point differential FPD or if the evaporator coil outlet temperature ECOT drops below −40° F. The cryogenic temperature control apparatus 12 can also begin operation in the Third Fresh Cooling Mode at startup if the return air temperature RA is less than or equal to the sum of first switch point temperature FS2 and the set point temperature SP and if the return air temperature RA is greater than the sum of the set point temperature SP and the second switch point temperature FS2.

In the Third Fresh Cooling Mode, the first control valve 26 is closed and the second control valve 32 is opened to provide a lower mass flow rate of cryogen through the evaporator coil 42. Additionally, the first and second fans 50, 52 are turned on and the damper 40 is opened to improve airflow through the heat exchanger 37 and the third valve 48 is closed to prevent heating.

The cryogenic temperature control apparatus 12 continues to operate in the Third Fresh Cooling Mode until either of two conditions is met. First, if the return air temperature RA drops below the sum of the set point temperature SP and a cool-to-null temperature ("CTN") (e.g., 0.9° F.), the cryogenic temperature control apparatus 12 switches to operation in the Null Fresh Mode. Second, if the return air temperature RA rises above the sum of the set point temperature SP, the second switch point temperature FS2, and the fresh switch offset FSO, the cryogenic temperature control apparatus 12 shifts from the Third Fresh Cooling Mode to the Second Fresh Cooling Mode.

As explained above, the cryogenic temperature control apparatus 12 can shift from operation in the Third Fresh Cooling Mode to operation in the Null Fresh Mode. The cryogenic temperature control apparatus 12 can also begin operation in the Null Fresh Mode if the return air temperature RA is within a control band differential ("CBD") (e.g., 4° F.) surrounding the set point temperature SP. Generally, the control band differential CBD is determined to be the preferred operating temperature range for a particular cargo and is therefore preferably user adjustable, but may also or alternatively be entered by the system administrator. If the return air temperature RA rises above the sum of the control band differential CBD and the set point temperature SP, the controller 34 is programmed to shift the cryogenic temperature control apparatus 12 from operation in the Null Fresh Mode to operation in the First Fresh Cooling Mode.

In the Null Fresh Mode, the first and second control valves 26, 32 are closed to prevent cryogen from flowing through the evaporator coil 42 and the third valve 48 is closed to prevent coolant from entering the heating element 53. Additionally, the first and second fans 50, 52 are turned off to conserve power and to prevent the fans 50, 52 from heating the air-conditioned space 14. However, in some applications, the first and second fans 50, 52 can remain on during the Null Fresh Mode to maintain airflow in the air-conditioned space 14.

When the cryogenic temperature control apparatus 12 is switching from operation in the Third Fresh Cooling Mode to operation in the Null Fresh Mode, the first and second control valves 26, 32 are closed, as explained above. However, some residual cryogen still remains in the evaporator coil 42 after the first and second control valves 26, 32 are closed. This residual cryogen provides additional cooling to the air-conditioned space 14 to pull down the temperature of the air-conditioned space 14 after the flow of cryogen has been stopped. Additionally, the cooling capacity of the residual cryogen in the evaporator coil 42 is approximately equal to the cool-to-null temperature CTN. Therefore, when the cryogenic temperature control apparatus 12 is shifted from the Third Fresh Cooling Mode to the Null Fresh Mode, the residual cryogen pulls the temperature of the air-conditioned space 14 down to the set point temperature SP.

The controller 34 is also programmed to accommodate failure of the sensors. More particularly, if during the First, Second, or Third Fresh Cooling Modes either the return air temperature sensor 45 or the evaporator coil outlet temperature sensor 46 record temperature values which are outside a predetermined value, indicating that the sensors are damaged or defective, the controller 34 is programmed to disregard the data supplied by that sensor. If a sensor fails, the cryogenic temperature control apparatus 12 activates an alarm (not shown) and continues to operate in the appropriate mode. If both the return air temperature sensor 45 and the evaporator coil outlet temperature sensor 46 fail, the cryogenic temperature control apparatus 12 operates in the Third Fresh Cooling Mode for a predetermined time period (e.g., two minutes) before shutting down.

If the controller 34 determines that either the return air temperature sensor 45 or the evaporator coil outlet temperature sensor 46 has failed during operation in the First or Second Fresh Cooling Modes, the controller 34 is preferably programmed to shift the cryogenic temperature control apparatus 12 into the Third Fresh Cooling Mode. If the return air temperature sensor 45 fails, the cryogenic temperature control apparatus 12 operates in the Third Fresh Cooling Mode until the evaporator coil outlet temperature ECOT drops below the sum of the set point temperature SP, the cool-to-null temperature CTN, and −5° F., at which time the cryogenic temperature control apparatus 12 shifts to the Null Fresh Mode. If the return air temperature sensor 45 fails and the evaporator coil outlet temperature ECOT rises above the sum of the set point temperature SP and the control band differential CBD, the controller 34 shifts from operation in the Null Fresh Mode to operation in the Third Fresh Cooling Mode.

If the evaporator coil outlet temperature sensor 46 fails during operation in the Null Fresh Cooling Mode, the cryogenic temperature control apparatus 12 continues to operate in the Null Fresh Mode until the return air temperature RA rises above the sum of the control band differential CBD and the set point temperature SP, at which time the controller 34 shifts to operation in the Third Fresh Cooling Mode.

In some applications, such as when the ambient temperature is below the set point temperature SP, it may be desirable to heat the air-conditioned space 14. Therefore, during operation in the Fresh Range, the cryogenic temperature control apparatus 12 can operate in a Heating Mode if the return air temperature RA drops below or becomes equal to the sum of the set point temperature SP and the control band differential CBD. Once the return air temperature RA reaches the set point temperature SP, the cryogenic temperature control apparatus 12 shifts into the Null Fresh Mode.

Figure 4:
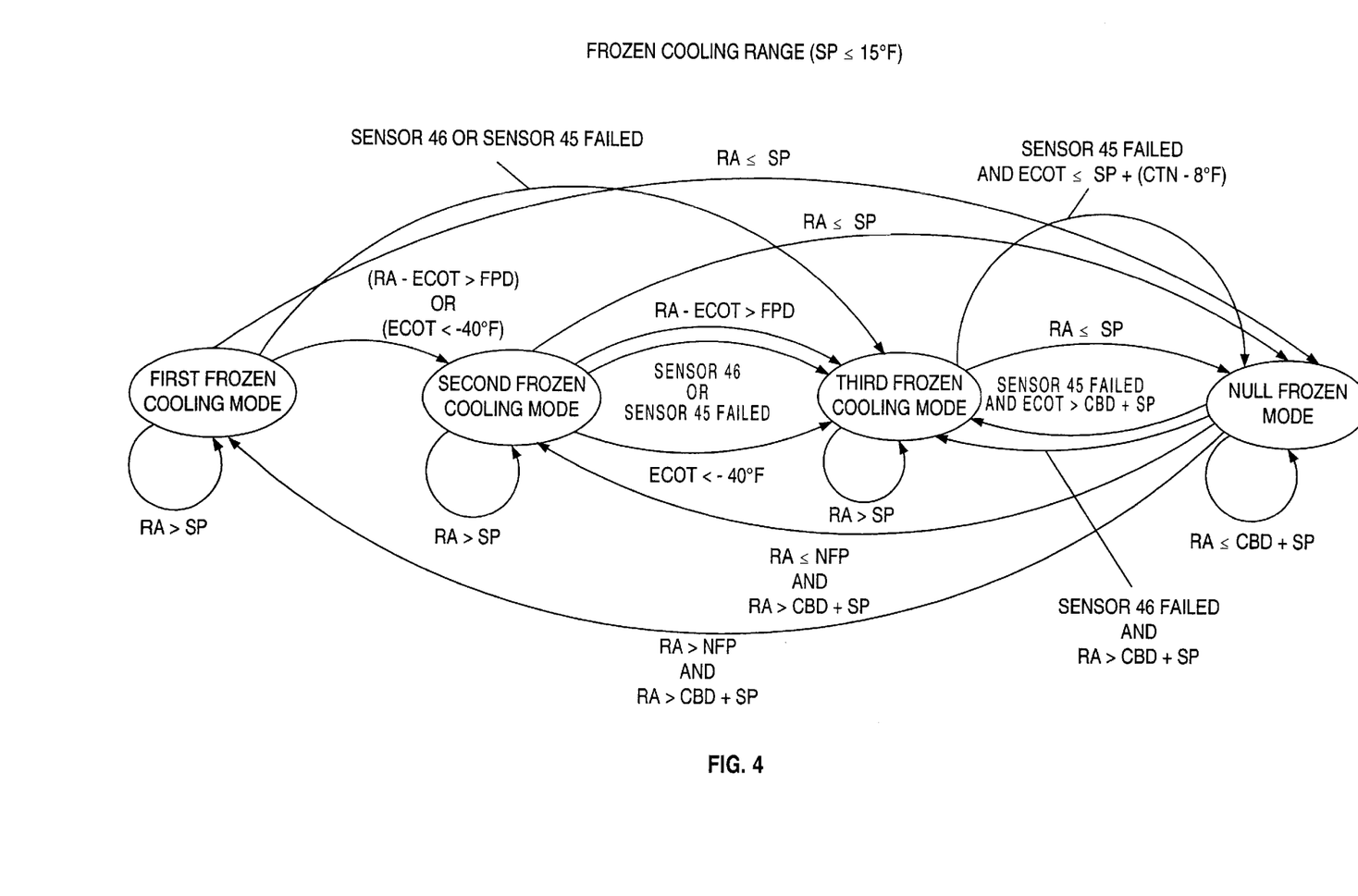
FIG. 4 is a diagram detailing operation in the Frozen Cooling Range.

Occasionally, water vapor from the air-conditioned space 14 can be separated from the air and can condense on the evaporator coil 42, forming frost. To minimize the formation of frost on the evaporator coil 42 and to remove frost from the evaporator coil 42, the controller 34 is programmed to operate the temperature control apparatus 12 in the Defrost Mode during operation in either the Fresh Range or the Frozen Range.

When the cryogenic temperature control apparatus 12 operates in the Defrost Mode, the first and second control valves 26, 32 are closed so that cryogen does not enter the evaporator coil 42. The third control valve 58 is opened to allow coolant to enter the heating element 53 and the damper 40 is closed to prevent warm air from entering the air-conditioned space 14. Preferably, the first and second fans 50, 52 are deactivated.

The cryogenic temperature control apparatus 12 can shift into the Defrost Mode in four different ways. First, the operator can manually direct the controller 34 to shift the cryogenic temperature control apparatus 12 into the Defrost Mode. However, to prevent the operator from unnecessarily initiating the Defrost Mode, the controller 34 is preferably programmed to prevent manual initiation unless either the evaporator coil outlet temperature ECOT is less than or equal to 35° F. or the set point temperature SP is less than or equal to 50° F.

Second, the Defrost Mode is initiated at predetermined time intervals (e.g., two hours) which are preferably programmed by the system administrator. However, unless the evaporator coil outlet temperature ECOT is less than or equal to 35° F. or the set point temperature SP is less than or equal to 50° F., the Defrost Mode will not be initiated at the predetermined time intervals.

Third, the Defrost Mode is initiated based upon demand when the controller 34 determines that specific requirements have been met. Specifically, the Defrost Mode is initiated if the evaporator coil outlet temperature ECOT is less than or equal to 35° F. and the mass flow rate of cryogen moving through the cryogenic temperature control apparatus 12 is above a predetermined mass flow rate ("M") (e.g., during operation in the Third Cooling Mode when the first control valve 26 is closed and the second control valve 32 is open). Alternatively, the Defrost Mode is initiated when the return air temperature RA minus the evaporator coil outlet temperature ECOT is above a predetermined amount (e.g., 8° F.), which is preferably adjustable and may be programmed by the system administrator. The predetermined mass flow rate M is a function of the operating environment, including expected ambient humidity levels and evaporator sizes and therefore is preferably determined by the system administrator or may be entered by the operator during startup.

Fourth, the Defrost Mode is automatically initiated when the evaporator coil outlet temperature ECOT is equal to or less than −40° F. and the mass flow rate of cryogen moving through the cryogenic temperature control apparatus 12 is above the predetermined mass flow rate M.

Once the Defrost Mode is initiated, defrosting continues until the air temperature around the defrost termination switch 48 is equal to the defrost termination temperature DTS (e.g., 45° F.) or the evaporator coil outlet temperature ECOT reaches 59° F. Additionally, in some applications, the controller 34 is programmed to terminate the Defrost Mode after a predetermined time.

Referring to FIG. 4, the Frozen Cooling Range includes five modes of operation, including a First Frozen Cooling Mode, a Second Frozen Cooling Mode, a Third Frozen Cooling Mode, a Null Frozen Mode, and a Defrost Mode. If the Frozen Cooling Range is selected (i.e., the set point temperature SP is less than 15° F.), the controller 34 directs the cryogenic temperature control apparatus 12 to begin operation in one of these modes based upon data supplied by the return air temperature sensor 45, the evaporator coil outlet sensor 46, and the defrost termination switch 48.

If the return air temperature RA is greater than the set point temperature SP, the cryogenic temperature control apparatus 12 begins operating in the First Frozen Cooling Mode. In the First Frozen Cooling Mode, the first and second control valves 26, 32 are opened to allow a maximum flow rate of cryogen through the evaporator coil 42, thereby providing a rapid temperature pull down. The first and second fans 50, 52 are turned on and the damper 40 is opened to provide airflow across the evaporator coil 42. Additionally, the third valve 58 is closed to ensure that no coolant enters the heating element 53. Once, the return air temperature RA becomes equal to or drops below the set point temperature SP, the cryogenic temperature control apparatus 12 is shifted from the First Frozen Cooling Mode to the Null Frozen Mode (described in more detail below).

As explained above with respect to the Fresh Cooling Range, some or all of the cryogen in the evaporator coil 42 may not evaporate during cooling operations and the evaporator coil 42 may begin to fill with liquid cryogen. If the flooding occurs, the cryogen may solidify in the evaporator coil 42 and may damage the cryogenic temperature control apparatus 12. Therefore, to prevent flooding, the cryogenic temperature control apparatus 12 shifts from the First Frozen Cooling Mode into the Second Frozen Cooling Mode if one of two conditions is met. First, if the difference between the return air temperature RA and the evaporator coil outlet temperature ECOT drops below the flood point differential FPD (e.g., 15° F.), the cryogenic temperature control apparatus 12 shifts into the Second Frozen Cooling Mode.

Second, if the evaporator coil outlet temperature ECOT drops below −40° F., the cryogenic temperature control apparatus 12 shifts into the Second Frozen Cooling Mode.

In the second Frozen Cooling Mode, the first valve 26 is opened and the second valve 32 is closed to provide a second flow rate of cryogen through the evaporator coil 42, thereby providing a relatively rapid temperature pull down and simultaneously conserving cryogen. The first and second fans 50, 52 are turned on and the damper 40 remains opened to allow airflow across the evaporator coil 42. Additionally, the third valve 48 is closed to prevent heating.

The cryogenic temperature control apparatus 12 continues to operate in the Second Frozen Cooling Mode as long at the return air temperature RA remains above the set point temperature SP and until one of three conditions is achieved. First, if the difference between the return air temperature RA and the evaporator coil outlet temperature ECOT drops below the flood point differential FPD, the cryogenic temperature control apparatus 12 shifts into the Third Frozen Mode. Second, if the evaporator coil outlet temperature ECOT drops below −40° F., the cryogenic temperature control apparatus 12 shifts into the Third Frozen Mode. Third, if the return air temperature RA becomes equal to or drops below the set point temperature SP, the cryogenic temperature control apparatus 12 is shifted from operation in the Second Frozen Cooling Mode to operation in the Null Frozen Cooling Mode.

In the Third Frozen Cooling Mode, the first control valve 26 is closed and the second control valve 32 is opened to provide a relatively low mass flow rate of cryogen through the evaporator coil 42. Additionally, the first and second fans 50, 52 are turned on and the damper 40 remains opened to allow airflow through the heat exchanger 37 and the third valve 48 is closed to prevent heating.

If the return air temperature RA drops below or becomes equal to the set point temperature SP, the cryogenic temperature control apparatus 12 shifts from the Third Frozen Cooling Mode to the Null Frozen Mode. In the Null Frozen Mode, the first and second control valves 26, 32 are closed and the first and second fans 50, 52 remain on for a predetermined time (e.g., 30 seconds) and then shut off.

The cryogenic temperature control apparatus 12 continues to operate in the Null Frozen Mode as long as cooling is required and the return air temperature RA is less than or equal to the sum of the set point temperature SP and a predetermined control band differential CBD (e.g., 4° F.). If the return air temperature RA rises above the sum of the control band differential CBD and the set point temperature SP and if the return air temperature RA is greater than a null flood prevent temperature ("NFP") (e.g., 15° F.), the cryogenic temperature control apparatus 12 shifts to the First Frozen Cooling Mode. Conversely, if the return air temperature RA rises above the sum of the control band differential CBD and the set point temperature SP and the return air temperature RA is less than or equal to the null flood prevent temperature NFP (e.g., 15° F.), the cryogenic temperature control apparatus 12 shifts into the Second Frozen Cooling Mode.

The controller 34 is also preferably programmed to accommodate failure of one or both of the return air sensor 45 and/or the evaporator coil outlet temperature sensor 46 during operation in the Frozen Cooling Range. As explained above with respect to operation in the Fresh Cooling Range, the controller 34 determines whether or not the return air temperature sensor 45 and the evaporator coil outlet temperature sensor 46 are damaged or defective by comparing the data supplied by the sensors to predetermined expected ranges. If the return air temperature sensor 45 or the evaporator coil outlet temperature sensor 46 record values outside these expected ranges, the controller 34 disregards the data supplied by that sensor and relies on the data supplied by the other sensor.

Specifically, if the cryogenic temperature control apparatus 12 is operating in either the First Frozen Cooling Mode or the Second Frozen Cooling Mode and the controller 34 determines that the return air temperature sensor 45 or the evaporator coil temperature sensor 46 has failed, the cryogenic temperature control apparatus 12 is shifted into the Third Frozen Cooling Mode.

Similarly, the cryogenic temperature control apparatus 12 is shifted from the Null Frozen Mode to the Third Frozen Cooling Mode if the controller 34 determines that the return air temperature sensor 45 has failed and the evaporator coil outlet temperature ECOT is greater than the sum of the set point temperature SP and the control band differential CBD. Alternatively, the cryogenic temperature control apparatus 12 is shifted from the Null Frozen Mode to the Third Cooling Mode if the controller 34 determines that the evaporator coil outlet temperature sensor 46 has failed and the return air temperature RA is greater than the sum of the set point temperature SP and the control band differential CBD. Also, the cryogenic temperature control apparatus 12 shifts from the Third Frozen Cooling Mode to the Null Frozen Mode if the controller 34 determines that the return air temperature sensor 45 has failed and the evaporator coil outlet temperature ECOT is greater than or equal to the sum of the set point temperature SP, the cool-to-null temperature CTN and −8° F.

As explained above, the cryogenic temperature control apparatus 12 operates in a Defrost Mode during operation in the Frozen Range. However, operation of the Defrost Mode during the Frozen Range is substantially similar to operation of the Defrost Mode during the Fresh Range and is therefore not described further herein.

During operation in either the Fresh Range or the Frozen Range, the controller 34 is preferably programmed to include time delays when shifting between the various modes of operation. This ensures that a temperature spike does not shift the cryogenic temperature control apparatus 12 into an inappropriate mode. In different applications, the delays can be any length but are preferably between one second and twenty seconds.

The cryogenic temperature control apparatus 12 includes a door sensor 62, which is operable to determine if the doors 19 are open or closed. Preferably, the cryogenic temperature control apparatus 12 shuts down operation when the doors 19 are opened and does not resume normal operation until the doors 19 are closed. Alternatively, in some embodiments, the system administrator can program the controller 34 to resume normal operation if the doors 19 remain open for an extended time.

The embodiments described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the appended claims.

For example, the present invention is described herein as being used to pull down and maintain the temperature in a truck 16 having a single air-conditioned space 14. However, one having ordinary skill in the art will appreciate that the present invention could also be used in trucks or trailers having multiple air-conditioned spaces 14. Similarly, the present invention can also be used to pull down and maintain the temperature in buildings, containers, and the like.

Similarly, the present invention is described herein as including a first control valve 26 with a first relatively large orifice and a second control valve 32 with a second smaller orifice. This arrangement preferably provides four distinct mass flow rates. One having ordinary skill in the art will appreciate that in other applications additional valves can be used to provide additional flow rates. Also, one having ordinary skill in the art will appreciate that an adjustable valve, a pulse valve, an expansion valve, or the like could be used to provide additional mass flow rates and additional modes of operation.

As such, the functions of the various elements and assemblies of the present invention can be changed to a significant degree without departing from the spirit and scope of the present invention.

What is claimed is:

1. A method of temperature control in a cryogenic temperature control apparatus comprising:
   providing a heat exchanger in thermal communication with an air-conditioned space, the heat exchanger including an air inlet and an evaporator coil having an outlet;
   providing a first temperature sensor operatively coupled to a controller, the first temperature sensor measuring the temperature in the outlet and sending the temperature in the outlet to the controller;
   providing a second temperature sensor operatively coupled to the controller, the second temperature sensor measuring the temperature in the air inlet, and sending the temperature in the air inlet to the controller;
   providing a first plurality of temperature control values and a second plurality of temperature control values;
   altering the flow of cryogen from a storage tank to the evaporator coil each time the temperature in the outlet passes one of the first plurality of temperature control values; and
   altering the flow of cryogen from the storage tank to the evaporator coil each time the temperature in the air inlet passes one of the second plurality of temperature control values;
   wherein the controller uses ladder logic.

2. The method of claim 1, wherein the temperature control apparatus includes a valve positioned between the storage tank and the evaporator coil, the valve altering the flow of cryogen from the storage tank to the evaporator coil.

3. The method of claim 2, wherein the valve has a first position corresponding to a first mass flow rate of cryogen from the storage tank to the evaporator coil and a second position corresponding to a second mass flow rate of cryogen from the storage tank to the evaporator coil and wherein altering the flow of cryogen from the storage tank to the evaporator coil includes moving the valve between the first position and the second position.

4. The method of claim 2, wherein the first valve has a first position and a second position, and further comprising:
   providing a second valve between the storage tank and the evaporator coil, the second valve altering the flow of cryogen from the storage tank to the evaporator coil, the second valve having a third position and a fourth position;
   moving the first valve into the first position and moving the second valve into the third position to provide a first mass flow rate of cryogen from the storage tank to the evaporator coil;
   moving the first valve into the first position and moving the second valve into the fourth position to provide a second mass flow rate of cryogen from the storage tank to the evaporator coil;
   moving the first valve into the second position and moving the second valve into the third position to provide a third mass flow rate of cryogen from the storage tank to the evaporator coil; and
   moving the first valve into the second position and moving the second valve into the fourth position to provide a fourth mass flow rate of cryogen from the storage tank to the evaporator coil.

5. A method of temperature control in a cryogenic temperature control apparatus comprising:
   providing a heat exchanger in thermal communication with an air-conditioned space, the heat exchanger including an air inlet and an evaporator coil having an outlet;
   providing a first temperature sensor operatively coupled to a controller, the first temperature sensor measuring the temperature in the outlet and sending the temperature in the outlet to the controller;
   providing a second temperature sensor operatively coupled to the controller, the second temperature sensor measuring the temperature in the air inlet, and sending the temperature in the air inlet to the controller;
   providing a first plurality of temperature control values and a second plurality of temperature control values;
   altering the flow of cryogen from a storage tank to the evaporator coil each time the temperature in the outlet passes one of the first plurality of temperature control values; and
   altering the flow of cryogen from the storage tank to the evaporator coil each time the temperature in the air inlet passes one of the second plurality of temperature control values;
   wherein the heat exchanger includes a heating element, the method further comprising:
     providing a third plurality of temperature control values and a fourth plurality of temperature control values;
     discontinuing the flow of cryogen from the storage tank to the evaporator coil each time the temperature in the outlet passes one of the third plurality of temperature control values;
     discontinuing the flow of cryogen from the storage tank to the evaporator coil each time the temperature in the air inlet passes one of the fourth plurality of temperature control values;
     heating air in the heat exchanger with the heating element each time the temperature in the outlet passes one of the third plurality of temperature control values; and
     heating air in the heat exchanger with the heating element each time the temperature in the air inlet passes one of the fourth plurality of temperature control values.

6. A method of temperature control in a cryogenic temperature control apparatus comprising:
   providing a heat exchanger in thermal communication with an air-conditioned space, the heat exchanger including an air inlet and an evaporator coil having an outlet;

providing a first temperature sensor operatively coupled to a controller, the first temperature sensor measuring the temperature in the outlet and sending the temperature in the outlet to the controller;

providing a second temperature sensor operatively coupled to the controller, the second temperature sensor measuring the temperature in the air inlet, and sending the temperature in the air inlet to the controller;

providing a first plurality of temperature control values and a second plurality of temperature control values;

altering the flow of cryogen from a storage tank to the evaporator coil each time the temperature in the outlet passes one of the first plurality of temperature control values; and altering the flow of cryogen from the storage tank to the evaporator coil each time the temperature in the air inlet passes one of the second plurality of temperature control values;

providing a first cooling mode corresponding to a first flow rate of cryogen from the storage tank to the evaporator coil; and providing a second cooling mode corresponding to a second flow rate of cryogen from the storage tank to the evaporator coil; and wherein altering the flow of cryogen from the storage tank to the evaporator coil includes switching between the first cooling mode and the second cooling mode.

7. The method of claim 1, further comprising:

providing a first cooling mode corresponding to a first flow rate of cryogen from the storage tank to the evaporator coil;

providing a second cooling mode corresponding to a second flow rate of cryogen from the storage tank to the evaporator coil;

providing a third cooling mode corresponding to a third flow rate of cryogen from the storage tank to the evaporator coil; and wherein altering the flow of cryogen from the storage tank to the evaporator coil includes switching between the first cooling mode, the second cooling mode, and the third cooling mode.

8. The method of claim 1, further comprising:

providing a first cooling mode corresponding to a first flow rate of cryogen from the storage tank to the evaporator coil;

providing a second cooling mode corresponding to a second flow rate of cryogen from the storage tank to the evaporator coil;

providing a third cooling mode corresponding to a third flow rate of cryogen from the storage tank to the evaporator coil;

providing a fourth cooling mode corresponding to a fourth flow rate of cryogen from the storage tank to the evaporator coil; and wherein altering the flow of cryogen from the storage tank to the evaporator coil includes switching between the first cooling mode, the second cooling mode, the third cooling mode, and the fourth cooling mode.

9. A method of controlling a temperature of an air-conditioned space with a cryogenic temperature control apparatus, the cryogenic temperature control apparatus including a storage tank housing cryogen and a heat exchanger in thermal communication with the air-conditioned space, the heat exchanger including an evaporator coil, the evaporator coil in fluid communication with the storage tank and having an outlet, the method comprising:

providing a temperature sensor operatively coupled to a controller, the temperature sensor measuring an outlet temperature in the outlet and transmitting the outlet temperature the controller;

providing a first plurality of temperature control values providing a first valve positioned between the storage tank and the evaporator coil, the first valve being moveable between a first open position and a first closed position;

providing a second valve positioned between the storage tank and the evaporator coil, the second valve being moveable between a second open position and a second closed position, a first volume of cryogen being moveable between the storage tank and the evaporator coil when the first valve is in the first open position and the second valve is in the second open position, a second volume of cryogen being moveable between the storage tank and the evaporator coil when the first valve is in the first open position and the second valve is in the second closed position; and moving the first valve from the first open position to the first closed position each time the temperature in the outlet passes one of the first plurality of temperature control values.

10. The method of claim 9, further comprising:

providing a second temperature sensor being operatively coupled to the controller, the second temperature sensor measuring a second temperature in the air inlet and transmitting the second temperature to the controller;

providing a second plurality of temperature control values; and altering the flow of cryogen from the first mass flow rate to the second mass flow rate each time the temperature in the air inlet passes one of the second plurality of temperature control values.

11. The method of claim 9, further comprising:

providing a third mass flow rate of cryogen from the storage tank through the evaporator coil;

providing a third plurality of temperature control values;

altering the flow of cryogen from the first mass flow rate or the second mass flow rate to the third mass flow rate each time the temperature in the outlet passes one of the third plurality of temperature control values; and altering the flow of cryogen from the first mass flow rate or the second mass flow rate to the third mass flow rate each time the temperature in the air inlet passes one of the third plurality of temperature control values.

12. The method of claim 11, further comprising:

providing a fourth mass flow rate of cryogen from the storage tank through the evaporator coil;

providing a fourth plurality of temperature control values;

altering the flow of cryogen from the first mass flow rate, the second mass flow rate, or the third mass flow rate to the fourth mass flow rate each time the temperature in the outlet passes one of the fourth plurality of temperature control values; and altering the flow of cryogen from the first mass flow rate, the second mass flow rate, or the third mass flow rate to the fourth mass flow rate each time the temperature in the air inlet passes one of the fourth plurality of temperature control values.

13. The method of claim 9, wherein the controller uses ladder logic.

14. A method of temperature control in a cryogenic temperature control apparatus, the temperature control apparatus including a storage tank housing a cryogen and a heat exchanger in thermal communication with an air-conditioned space, the heat exchanger including an air inlet and an evaporator coil in fluid communication with the storage tank, the evaporator coil having an outlet, the method comprising:

provviding a first temperature sensor being operatively coupled to a controller, the first temperature sensor measuring the temperature in the outlet and sending the temperature in the outlet to the controller;

providing a second temperature sensor being operatively coupled to the controller, the second temperature sensor measuring the temperature in the air inlet, and sending the temperature in the air inlet to the controller;

providing a first plurality of temperature control values and a second plurality of temperature control values;

providing a first mass flow rate of cryogen from the storage tank through the evaporator coil;

providing a second mass flow rate of cryogen from the storage tank through the evaporator coil;

altering the flow of cryogen from the first mass flow rate to the second mass flow rate each time the temperature in the outlet passes one of the first plurality of temperature control values;

altering the flow of cryogen from the first mass flow rate to the second mass flow rate each time the temperature in the air inlet passes one of the second plurality of temperature control values, wherein the heat exchanger includes a heating element;

providing a third plurality of temperature control values and a fourth plurality of temperature control values;

discontinuing the flow of cryogen from the storage tank to the evaporator coil each time the temperature in the outlet passes one of the third plurality of temperature control values;

discontinuing the flow of cryogen from the storage tank to the evaporator coil each time the temperature in the air inlet passes one of the fourth plurality of temperature control values;

heating air in the heat exchanger with the heating element each time the temperature in the outlet passes one of the third plurality of temperature control values; and heating air in the heat exchanger with the heating element each time the temperature in the air inlet passes one of the fourth plurality of temperature control values.

15. A method of temperature control in a cryogenic temperature control apparatus, the cryogenic temperature control apparatus including an evaporator coil having an outlet and extending through a heat exchanger, the heat exchanger having an air inlet in thermal communication with an air-conditioned space, the method comprising:

providing a first mode of operation corresponding to a first mass flow rate of cryogen through the evaporator coil;

providing a second mode of operation corresponding to a second mass flow rate of cryogen through the evaporator coil;

providing a first temperature sensor operatively coupled to a controller which uses ladder logic, the first temperature sensor measuring the temperature in the air inlet and sending the temperature in the air inlet to the controller;

providing a second temperature sensor operatively coupled to the controller, the second temperature sensor measuring the temperature in the outlet and sending the temperature in the outlet to the controller;

providing a first plurality of temperature control values and a second plurality of temperature control values;

shifting between the first mode of operation and the second mode of operation each time the temperature in the outlet passes one of the first control values; and shifting between the first mode of operation and the second mode of operation each time the temperature in the air inlet passes one of the second control values.

16. The method of claim 15, further comprising:

providing a third cooling mode corresponding to a third flow rate of cryogen from the storage tank to the evaporator coil;

providing a third plurality of temperature control values and a fourth plurality of temperature control values;

shifting between the first mode of operation or the second mode of operation and the third mode of operation each time the temperature in the outlet passes one of the third control values; and shifting between the first mode of operation or the second mode of operation and the third mode of operation each time the temperature in the air inlet passes one of the fourth control values.

17. The method of claim 15, further comprising providing a valve upstream from the evaporator coil and the valve altering the flow of cryogen through the evaporator coil.

18. The method of claim 17, wherein the valve has a first position corresponding to the first mass flow rate and a second position corresponding to the second mass flow rate and wherein shifting between the first mode of operation and the second mode of operation includes moving the valve between the first position and the second position.

19. The method of claim 15, further comprising:

a first valve and a second valve, the first and second valves being upstream from the evaporator coil, the first valve having a first position and second position;

providing a first mass flow rate when the first valve is in the first position and the second valve is in the third position;

providing a second mass flow rate when the first valve is in the second position and the second valve is in the third position;

providing a third mass flow rate when the first valve is in the first position and the second valve is in the fourth position; and providing a fourth mass flow rate when the first valve is in the second position and the second valve is in the fourth position and wherein shifting between the first mode of operation and the second mode of operation includes moving the first valve between the first position and the second position and moving the second valve between the third position and the fourth position.

* * * * *